United States Patent [19]

Beeghly et al.

[11] Patent Number: 4,574,857
[45] Date of Patent: Mar. 11, 1986

[54] TRACTOR TIRE TREAD

[75] Inventors: Richard M. Beeghly; William P. Cundiff, both of Cumberland, Md.; William H. Legas, Garrett, Pa.; Lawrence B. Hurst, Jr., La Vale; Robert L. Crump, Cumberland, both of Md.; Robert E. Boore, Hyndman, Pa.

[73] Assignee: The Goodyear Tire & Rubber Company, Akron, Ohio

[21] Appl. No.: 668,125

[22] Filed: Nov. 5, 1984

[51] Int. Cl.<sup>4</sup> ................ B60C 11/04; B60C 11/11
[52] U.S. Cl. .............................. 152/209 B; D12/147
[58] Field of Search ........... 152/209 B, 209 D, 209 R; D12/140, 147, 148, 150

[56] References Cited

U.S. PATENT DOCUMENTS

D. 138,808  9/1944  French .
D. 170,873  11/1953  Kaufman .
D. 211,552  6/1968  Cuengros ............................ D12/147
D. 237,481  11/1975  Eves ..................................... D12/147
4,262,720  4/1981  Hanke ................................. D12/147

FOREIGN PATENT DOCUMENTS 755137  8/1956  United Kingdom ............ 152/209 B
1236335  6/1971  United Kingdom .
D954423  10/1971  United Kingdom .

OTHER PUBLICATIONS

Tread Design Guide, 1978; Bennett Garfield Publication, pp. 190, 191, 202.

Primary Examiner—Michael Ball
Attorney, Agent, or Firm—L. R. Drayer

[57] ABSTRACT

A pneumatic tire (10) has a tread (12) has a continuous center rib (24) extending circumferentially about the tread. A set of traction lugs (30,32) extend inwardly from each axial edge of the tread. Independent traction elements (58,60) are disposed circumferentially between circumferentially next adjacent traction lugs. The center rib (24) and the traction lugs (30,32) are substantially the same height, but the independent traction elements (58,60) have a lower height. An axially oriented arc of the tread has a radius such that a footprint of the tire has a maximum axial width that is in the range of 40% to 80% of the arc width of the tread.

8 Claims, 6 Drawing Figures

TRACTOR TIRE TREAD

The present invention relates generally to pneumatic tires, and more specifically to pneumatic tires used on agricultural tractors and similar vehicles.

Agricultural tractors equipped with four wheel drive or "mechanical front wheel assist" are becoming more widely used in the agricultural industry than they have been in the past. "Four wheel drive" means that both the front and rear wheels of a vehicle are driven by the vehicle's engine whenever the vehicle moves about. "Mechanical front wheel assist" and "front wheel assist" mean that while the rear wheels of a vehicle are driven by the vehicle's engine at all times when the vehicle moves about, a vehicle operator can choose to have the vehicle's front wheels driven also at selected times when extra traction is required. Generally speaking, agricultural tractors with four wheel drive have the same size tires on both the front and rear wheels, while an agricultural tractor with mechanical front wheel assist has smaller tires on the front wheels than on the rear wheels.

Until now it has been a generally accepted practice in the agricultural industry to use tires originally designed for use on driven rear wheels on both the front and rear wheels of tractors equipped with four wheel drive or mechanical front wheel assist. Such a practice is not desirable because tires on front steering wheels are subjected to different load forces and wear differently than tires on non-steering rear wheels. For example, turning forces are more significant upon front tires than upon rear tires. The prior art tires intended for use on driven rear wheels of agricultural tractors most often have ground-engaging tread portions comprising only large laterally oriented lugs, and do not have any circumferentially extending ribs. The commonly used tires for non-driven steering wheels of agricultural tires have circumferentially extending ribs, but do not have any laterally extending traction lugs. Prior art tractor tires designed for use on driven rear wheels have exhibited irregular wear patterns and rapid wear when used on front steering wheels, and also give a harsh ride when the vehicle is operated on a hard surface. It is believed that these undesirable characteristics of prior art rear tractor tires used on front steering wheels of tractors can be overcome by the new tires disclosed herein. While it is believed that the tires of the present invention may be used most advantageously on either continuously or intermittently driven front steering wheels, it is believed that they may also be used on rear driving wheels without experiencing any undesirable results.

There is provided in accordance with one aspect of the invention a pneumatic tire comprising a directional type tread extending circumferentially about an axis of rotation of said tire, said tread comprising: (a) a continuous center rib extending circumferentially about said tread with about one-half of the center rib disposed on each side of a mid-circumferential plane of the tire, said center rib having an arc width that is in the range of 15% to 35% of the arc width of said tread, said center rib presenting on each side of the mid-circumferential plane a plurality of circumferentially spaced apart substantially axially oriented leading edges that are oriented substantially parallel to the axis of rotation of said tire, said leading edges of the center rib each having an arc width in the range of 2% to 5% of the arc width of said tread; and (b) first and second sets of circumferentially spaced apart traction lugs, each lug of said first set of traction lugs beginning at a first axial edge of the tread and extending to an axially inner end that is axially spaced apart from said center rib, the axially inner end of each said traction lug being located between 20% to 40% of the arc width of said tread from said first axial edge of said tread, each traction lug having a leading edge with at least a portion of said leading edge being oriented at an angle in the range of 20° to 60° with respect to the mid-circumferential plane of the tire, each lug of the second set of traction lugs being similar to the lugs of the first set of traction lugs but opposite in hand and having a beginning at a second axial edge of the tread that is offset circumferentially of said tire with respect to the beginnings of the lugs of said first set of traction lugs; an axially oriented arc of said tread having a radius such that a footprint of the tire has a maximum axial width that is in the range of 40% to 80% of the arc width of said tread, and said center rib and traction lugs all have radially outer surfaces that will contact a hard ground surface in a footprint of the tire.

These and other features of the present invention can be better understood from the following detailed description of the preferred embodiments, when read in conjunction with the accompanying drawings in which.

Figure 1:
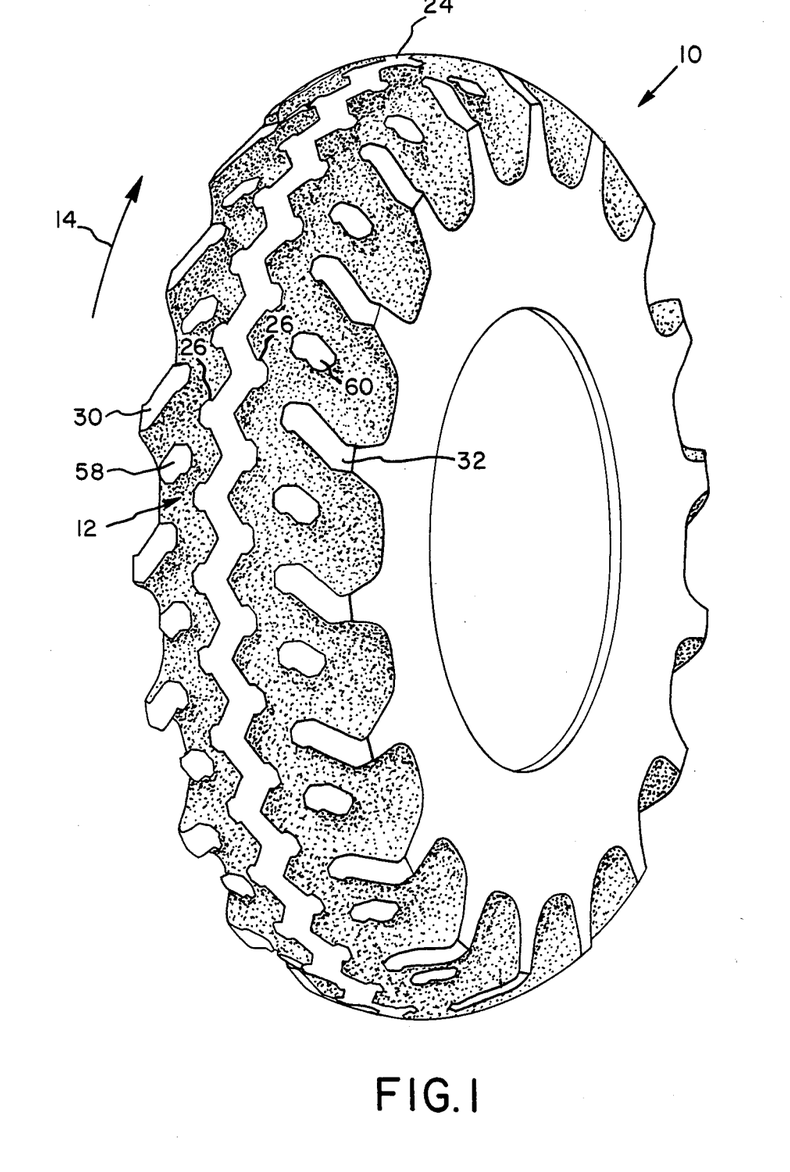
FIG. 1 is a perspective view of a tire according to the preferred embodiment of the invention.
Figure 2:
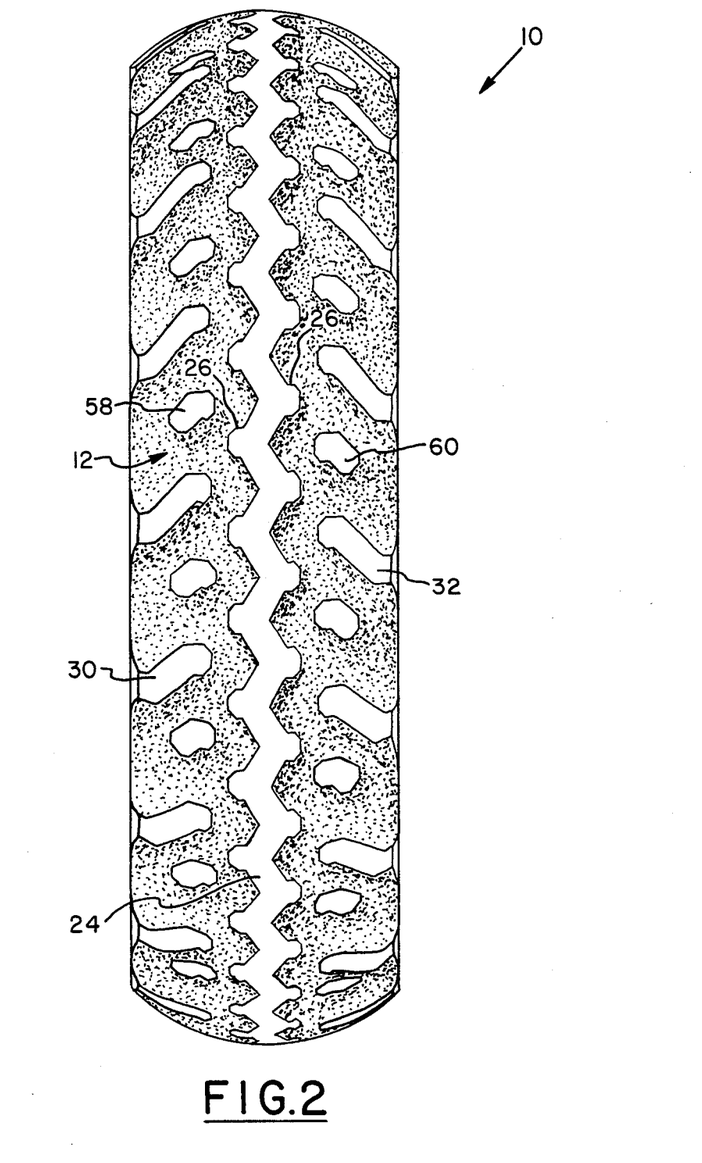
FIG. 2 is a front elevation view of the tire illustrated in FIG. 1.

Referring first to FIG. 1, there is shown a perspective view of a pneumatic tire 10 according to the preferred embodiment of the present invention. Said tire has a ground engaging tread 12 extending circumferentially about the axis of rotation of the tire. The tread comprises an elastomeric substance, or a combination of elastomeric substances, such as natural rubber or a synthetic rubber compound. The tread 12 is a "directional type" of tread, which means that it is designed to operate more efficiently when the tire is rotated in one direction than in the opposite direction. A tire according to the preferred embodiment is designed to be rotated in the direction indicated by the arrow 14 in FIG. 1 when a vehicle that the tire is mounted upon is moving forward. The edge of a tread element, such as a lug, that enters the footprint of a directional tire first when the tire is rotated in a forward direction is called a "leading edge", and the opposite edge of the tread element is called a "trailing edge".

Figure 4:
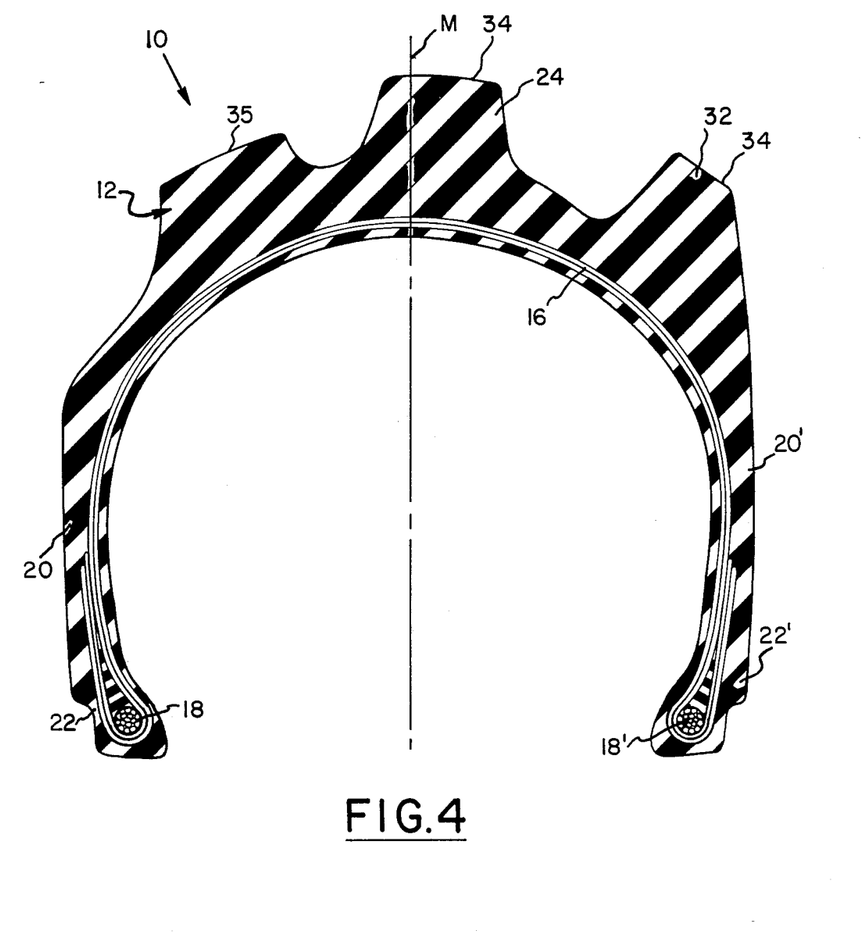
FIG. 4 is a radial cross-sectional view of the tire illustrated in FIG. 1, as taken along line A—A of FIG. 3.

It may be observed in FIG. 4, which is a radial cross-sectional view of a tire according to the invention, that when the tire is not subjected to a load the radially outer surfaces of the tread elements present an arcuate configuration when viewed in cross section. As used herein, the "arc width" of a tread, or any structural component of the tread, of a tire with a new tread is its width measured along the curvature of an arc lying in a plane that contains the axis of rotation of the tire when said arc coincides with the radially outermost surface(s) of the tread, as measured while the tire is mounted upon the specified rim, inflated to the specified inflation pressure and not subjected to any load. The arc used for measuring an arc width is referred to herein as an "axially oriented arc of the tread". As used herein a "footprint" is understood to mean the portion of a tire tread that contacts a hard ground surface (such as a paved roadway) when a tire with a new tread is mounted upon the specified rim, inflated to the specified inflation pressure, and subjected to the rated load. A "new tread" is understood to mean either the tread of a newly manufactured tire or the tread of a newly retreaded tire.

Figure 5:
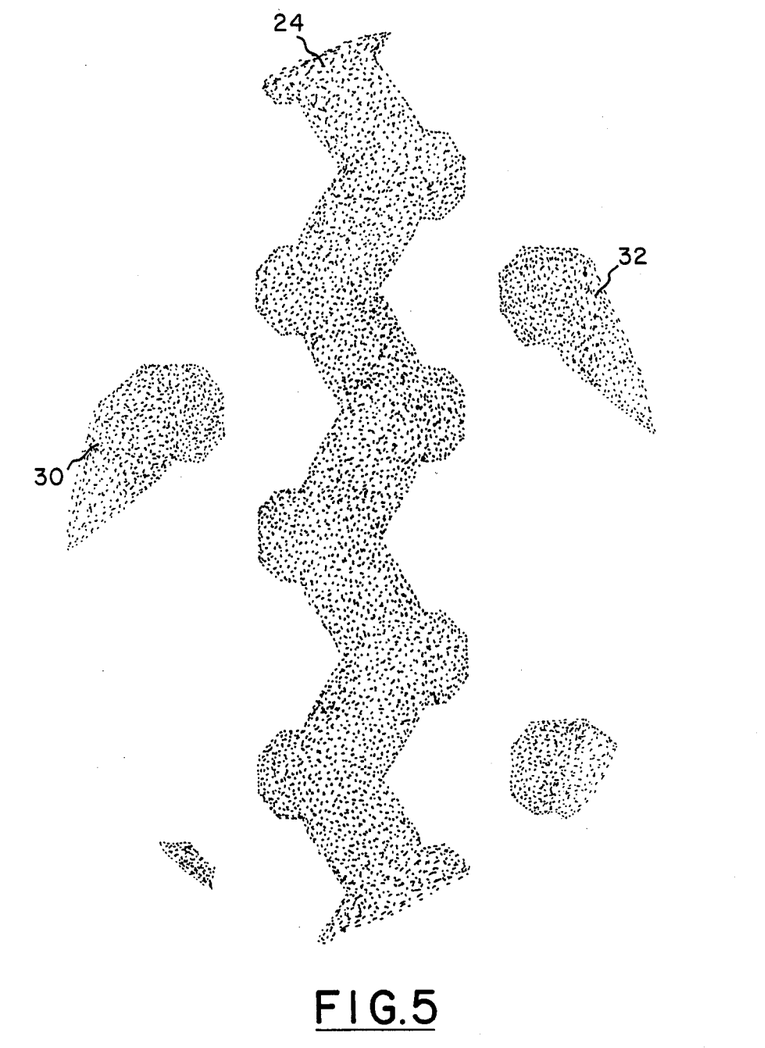
FIG. 5 is a footprint of the tire illustrated in FIG. 1.

An axially oriented arc of a tread of a tire with a new tread according to the invention has a radius such that a footprint of the tire has a maximum axial width that is in the range of 40% to 80%, preferably 40% to 65%, of the arc width of the tread. The center rib 24 and the traction lugs 30,32 all have radially outer surfaces 34 that will contact a hard ground surface in a footprint of the tire. The importance of this feature of the invention can be illustrated by referring to FIG. 5, which represents a footprint of a pneumatic tire of size 14.9-26 according to the preferred embodiment. This tire's tread had an arc width of 36.6 cm (14.4 inches) when the tire was mounted on the specified 12×26 rim and subjected a rated load of 2,057 kg. (4,530 pounds) while inflated to a design inflation pressure of 220 kPa (32 psi). The footprint of said tire, as illustrated in FIG. 5 had an actual maximum axial width of 26 cm (10.2 inches), which was 71% of the tread arc width. Therefore, when a tire according to the invention is operated on hard packed soil or a hard road surface, only the continuous center rib 24 and an axially innermost portion of the traction lugs 30,32 contact the ground. This allows the tire to provide good steering and ride characteristics. However, when the same tire is operated on softer ground, the portion of the tread that contacts the ground will be wider so that a greater portion of the traction lugs bite into the ground and the tire provides more traction. While the present invention lies in the structure of the tire considered as a whole, the ratio of "arc width of the tread" to "footprint width" and the height of the center rib and traction lugs are critical features that cooperate to contribute to the improvement of the new tire over prior art rear tractor tires mounted upon steering wheels of tractors.

Figure 3:
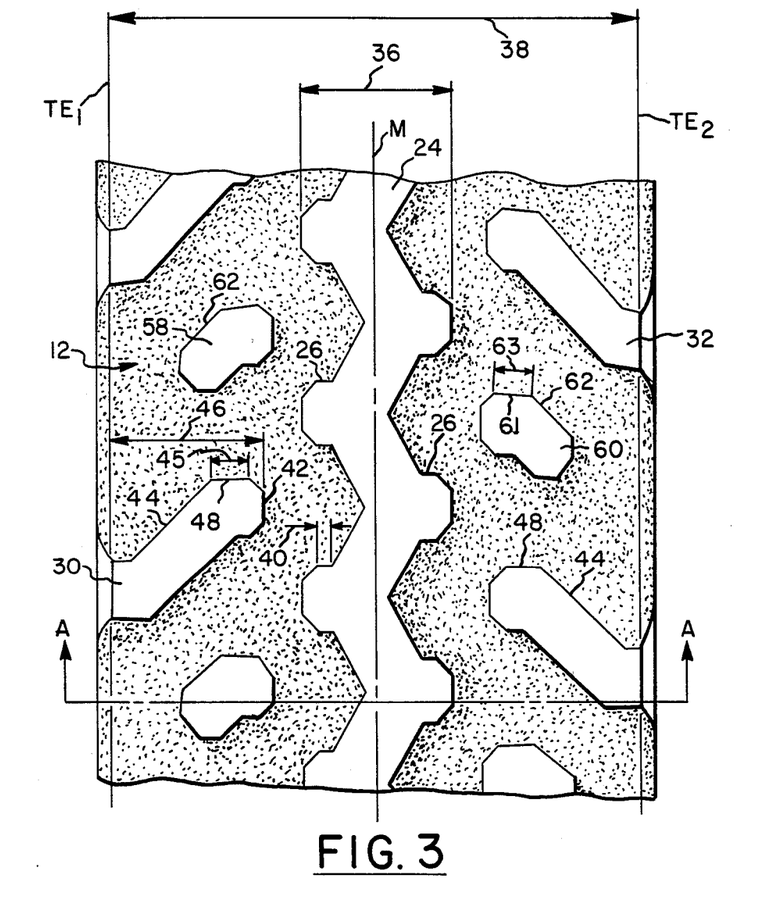
FIG. 3 is an enlarged plan view of a portion of the tread of the tire illustrated in FIG. 1.

The carcass structure of a pneumatic tire according to the present invention can be best described with reference to FIG. 4, which is a radial cross-sectional view of said tire taken along line A—A of FIG. 3. As used herein, "radial" and "radially" refer to directions perpendicular to the axis of rotation of said tire, and "axial" and "axially" refer to directions parallel to the axis of rotation of a tire. Therefore, "radially outwardly" refers to a direction going away from the axis of rotation of a tire, and "radially inwardly" refers to a direction going towards the axis of rotation of a tire. A carcass reinforcing structure 16 comprising one or more plies of reinforcing elements, such as textile or metallic filaments or cables, extends circumferentially about the tire radially inwardly of the tread 12. While the carcass reinforcing structure of the preferred embodiment is of the well-known bias ply type of construction, it is understood that a tire according to the invention may alternatively have a carcass reinforcing structure of the well-known radial ply type of construction or of any other type of construction. The carcass reinforcing structure 16 is anchored around a pair of substantially inextensible annular beads 18, 18[1]. Although a tire according to the illustrated preferred bias ply embodiment does not have a separate tread reinforcing structure, which could comprise what are commonly referred to in the tire art as belts or breakers, it is understood that a tire according to the invention could have such a tread reinforcing structure extending circumferentially about the tire between the carcass reinforcing structure and the tread. Sidewalls 20, 20[1] extend generally radially inwardly from the tread 12 to the bead portions 22, 22[1] of the tire.

As already pointed out in the introductory paragraphs, a pneumatic tire according to the present invention is primarily intended for use on an agricultural tractor, or a similar type of vehicle. Such a vehicle may be operated on a variety of surfaces such as paved roads, unplowed fields, plowed fields, and so forth. Furthermore, said tire is intended for, but not limited to, use on driven steering wheels, so that the traction, steering and ride characteristics of the tire are all very important.

The tread 12 of a tire 10 having a new tread according to the preferred embodiment of this invention may be described by referring to FIGS. 1 through 4.

Figure 6:
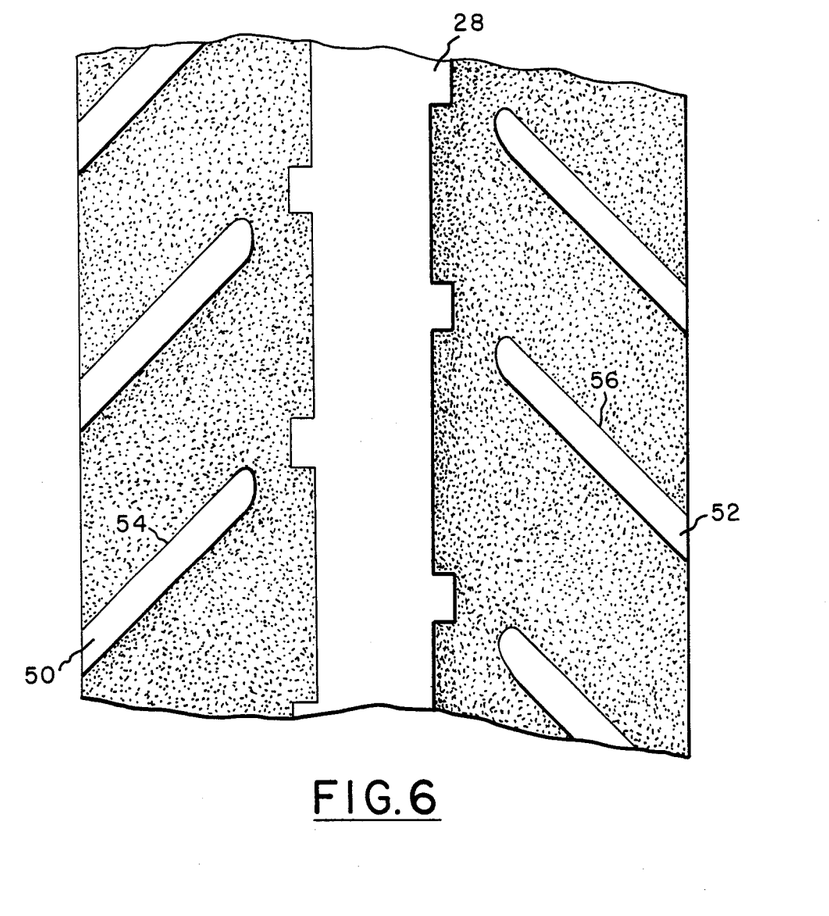
FIG. 6 is a fragmentary plan view of a tread of a tire according to an alternate embodiment of the invention.

A continuous center rib 24 extends circumferentially about the tread 12, with about one-half, and preferably exactly one-half, of the center rib disposed on each side of the mid-circumferential plane M. As used herein, the "mid-circumferential plane" of a tire is a plane that is perpendicular to the axis of rotation of the tire and is located midway between the sidewalls of a tire when the tire is mounted upon the specified rim, inflated to the specified pressure, and subjected to its rated load. As used herein, a "continuous" circumferential rib is one that is uninterrupted by axially oriented grooves along its entire circumferential length. The continuous circumferentially extending center rib is believed to contribute to the tire having good ride and steering characteristics. On each side of the mid-circumferential plane M the center rib 24 presents a plurality of circumferentially spaced apart substantially axially oriented, preferably oriented perpendicular to the mid-circumferential plane M, leading edges 26. In the preferred embodiment the center rib has a zig-zag configuration with one of the substantially axially oriented leading edges presented by the center rib being disposed at each projecting angle of the zig-zag center rib. In an alternative embodiment, such as that illustrated in FIG. 6, the center rib 28 may be a straight rib, or even sinusoidal (not illustrated). In the preferred embodiment the included angles between the legs of the zig-zags of the center rib are in the range of 20° to 45°, and preferably are 30°.

The center rib has an arc width 36 that is in the range of 15% to 35%, preferably 20% to 30%, of the arc width 38 of the tread. (Bearing in mind that throughout this specification these arc widths are actually being measured along the curvature of an arc.) The substantially axially oriented leading edges 26 presented by the center rib each have an arc width 40 in the range of 2% to 5% of the arc width of the tread. The substantially axially oriented leading edges of the center rib are believed to contribute to the traction characteristics of the tire without significantly effecting the steering and ride characteristics so long as the leading edges are not too long.

The tread of a tire according to the invention further comprises first and second sets of circumferentially spaced apart traction lugs 30,32. Each lug 30 of the first set of traction lugs begins at a first axial edge TE$_1$ of the tread and extends to an axially inner end 42 that is axially spaced apart from the center rib. The axially inner end of each traction lug is located a distance 46 of between 20% to 40%, preferably between 25% to 35%, of the arc width 38 of said tread from the first axial edge of the tread. Each traction lug has a leading edge 44, and at least a portion of said leading edge is oriented at an angle in the range of 20° to 60°, preferably in the range of 45° to 55° and most preferably 50°, with respect to the mid-circumferential plane M of the tire.

Each lug 32 of the second set of traction lugs is similar to the lugs of the first set of traction lugs but opposite in hand and has its beginning located at a second axial edge TE$_2$ of the tread. The beginnings of the lugs of the second set of traction lugs are offset circumferentially of the tire with respect to the beginnings of the lugs of the first set of traction lugs to provide better ride characteristics in the tire.

In the preferred embodiment the leading edge of each traction lug has a lateral portion 48 which is oriented substantially perpendicular, preferably exactly perpendicular, to the mid-circumferential plane M of the tire. However, the lateral portions of the leading edges of the traction lugs are not believed to be an essential feature of the tire according to the invention. For example, in the alternative embodiment shown in FIG. 6 the traction lugs 50,52 have leading edges which do not have lateral portions. In the preferred embodiment lateral portions of the leading edges of the traction lugs each have an arc width 45 in the range of 5% to 12%, preferably 5% to 8%, of the arc width 38 of the tread. The lateral portions of the leading edges of the traction lugs are located on the axially innermost one-half of each traction lug, most preferably very close to the axially inner ends of the traction lugs. The lateral portions of the leading edges of the traction lugs are believed to contribute to the traction characteristics of the tire without hurting ride characteristics so long as they are not too long.

In the preferred embodiment the tread of the tire further comprises first and second sets of independent traction elements 58,60. A traction element 58 of the first set of independent traction elements is disposed between each pair of circumferentially next adjacent lugs 30 of the first set of traction lugs. Each independent traction element has a leading edge, with at least a portion 62 of said leading edge being oriented at an angle in the range of 20° to 60°, preferably at the same angle as the leading edges 44 of the traction lugs, with respect to the mid-circumferential plane of the tire. The leading edge of each independent traction element has a lateral portion 61 that is oriented substantially perpendicular, preferably exactly perpendicular, to the mid-circumferential plane M of the tire. Preferably the lateral portions 61 of these leading edges have an arc width 63 in the range of 5% to 12% of the arc width of said tread. Most preferably the lateral portions 61 of the leading edges are located on the axially innermost one-half of the independent traction elements. The independent traction elements are axially spaced apart from both the center rib 24 and the nearest axial edge of the tread. While the independent traction lugs are not believed to be essential to the invention, (as illustrated by their absence from the alternate embodiment shown in FIG. 6), it is critical that if the tread has independent traction elements, they have radially outer surfaces 35 that will not contact a hard ground surface in a footprint of the tire. Put another way, the independent traction elements extend generally radially outwardly from a base surface of the tread only 35% to 65%, preferably 45% to 55% and most preferably 50%, of the distance that the traction lugs and center rib extend generally radially outwardly from said base surface of the tread. The height of the independent traction elements is critical because, if they are high enough to contact the ground when the tire operated on a hard surface, they will be detrimental to the tire's ride characteristics. However, in a tire according to the preferred embodiment of the invention the independent traction elements are believed to improve the traction of the tire on soft ground without hurting the ride of the tire on a hard surface.

The independent traction elements 60 of the second set of independent traction elements are similar to the traction elements of the first set of independent traction elements, but opposite in hand with a traction element 60 of said second set of independent traction elements being disposed between each pair of circumferentially next adjacent lugs of said second set of traction lugs.

While certain representative embodiments and details have been shown for the purpose of illustrating the invention, it will be apparent to those skilled in the art that various changes and modifications may be made therein without departing from the spirit or scope of the invention.

What is claimed is:

1. A pneumatic tire comprising a directional type tread extending circumferentially about an axis of rotation of said tire, said tread comprising: (a) a continuous center rib extending circumferentially about said tread with about one-half of the center rib disposed on each side of a mid-circumferential plane of the tire, said center rib having an arc width that is in the range of 15% to 35% of the arc width of said tread, said center rib presenting on each side of the mid-circumferential plane a plurality of circumferentially spaced apart substantially axially oriented leading edges that are oriented substantially parallel to the axis of rotation of said tire, said leading edges of the center rib each having an arc width in the range of 2% to 5% of the arc width of said tread; and (b) first and second sets of circumferentially spaced apart traction lugs, each lug of said first set of traction lugs beginning at a first axial edge of the tread and extending to an axially inner end that is axially spaced apart from said center rib, the axially inner end of each said traction lug being located between 20% to 40% of the arc width of said tread from said first axial edge of said tread, each traction lug having a leading edge with a portion of said leading edge being oriented at an angle in the range of 20° to 60° with respect to the mid-circumferential plane ofthe tire and a lateral portion of each said leading edge being oriented substantially perpendicular to the mid-circumferential plane of said tire, said lateral portion of the leading edge of each traction lug being located on the axially innermost portion of each traction lug and having an arc width in the range of 5% to 12% of the arc width of said tread, each lug of the second set of traction lugs being similar to the lugs of the first set of traction lugs but opposite in hand and having a beginning at a second axial edge of the tread that is offset circumferentially of said tire with respect to the beginnings of the lugs of said first set of traction lugs; an axially oriented arc of said tread having a radius such that a footprint of the tire has a maximum axial width that is in the range of 40% to 80% of the arc width of said tread, and said center rib and traction lugs all have radially outer surfaces that will contact a hard ground surface in a footprint of the tire.

2. A pneumatic tire as described in claim 1 further comprising first and second sets of independent traction elements, a traction element of said first set of independent traction elements being disposed between each pair of circumferentially next adjacent lugs of said first set of traction lugs and having a leading edge with at least a portion of said leading edge oriented at an angle in the range of 20° to 60° with respect to the mid-circumferential plane of said tire, said independent traction elements being axially spaced apart from both said center rib and the nearest axial edge of the tread, said independent traction elements each having a radially outer surface that will not contact a hard ground surface in a footprint of the tire, the traction elements of said second set of independent traction elements being similar to the traction elements of said first set of independent traction elements but opposite in hand with a traction element of said second set of independent traction elements being disposed between each pair of circumferentially next adjacent lugs of said second set of traction lugs.

3. A pneumatic tire as described in claim 1 further comprising first and second sets of independent traction elements, a traction element of said first set of independent traction elements being disposed circumferentially between each pair of circumferentially next adjacent lugs of said first set of traction lugs and having a leading edge with at least a portion of said leading edge oriented at an angle in the range of 20° to 60° with respect to the mid-circumferential plane of said tire, said independent traction elements being axially spaced apart from both said center rib and the respective axial edge of the tread, said independent traction elements each having a radially outer surface that will not contact a hard ground surface in a footprint of the tire, the traction elements of said second set of independent traction elements being similar to the traction elements of said first set of independent traction elements but opposite in hand with a traction element of said second set of independent traction elements being disposed between each pair of circumferentially next adjacent lugs of said first set of traction lugs.

4. A pneumatic tire as described in claim 3 wherein the leading edge of each independent traction element has a lateral portion that is oriented substantially perpendicular to the mid-circumferential plane of said tire, said lateral portions of the leading edges of the independent traction elements having an arc width in the range of 5% to 12% of the arc width of said tread.

5. A pneumatic tire as described in any one of claims 1, 2, 3, or 4 wherein said center rib is a zig-zag rib with one of the substantially axially oriented leading edges presented by the center rib being disposed at each projecting angle of said zig-zag center rib.

6. A pneumatic tire as described in any one of claims 1, 2, 3, or 4 an arc of said tread has a radius such that a footprint of the tire will have an axial width as its widest point in the range of 40% to 65% of the arc width of said tread.

7. A pneumatic tire as described in claim 5 wherein an axially oriented arc of said tread has a radius such that a footprint of the tire will have an axial width as its widest point in the range of 40% to 65% of the arc width of said tread.

8. A pneumatic tire as described in claim 7 wherein the arc width of said center rib is in the range of 20% to 30% of the arc width of said tread, and the axially inner end of each traction lug is located between 25% to 35% of the arc width of the tread from the respective axial edge of the tread.

* * * * *

UNITED STATES PATENT AND TRADEMARK OFFICE
CERTIFICATE OF CORRECTION

PATENT NO. : 4,574,857
DATED : March 11, 1986
INVENTOR(S) : Richard M. Beeghly et al It is certified that error appears in the above-identified patent and that said Letters Patent is hereby corrected as shown below:

Column 4, line 8, delete "$20_1$" and replace therewith --20'--.

Column 8, line 21, after the number "4", insert the word --wherein--.

Signed and Sealed this

Eighteenth Day of November, 1986

*Attest:*

DONALD J. QUIGG

*Attesting Officer*      *Commissioner of Patents and Trademarks*